United States Patent

Usami

[11] Patent Number: 6,032,379
[45] Date of Patent: Mar. 7, 2000

[54] TAPE MEASURE

[75] Inventor: Tsutomu Usami, Kyoto, Japan

[73] Assignee: Kyoto Measuring Instruments Corp., Kyoto, Japan

[21] Appl. No.: 08/993,560

[22] Filed: Dec. 18, 1997

[30] Foreign Application Priority Data

Sep. 16, 1997 [JP] Japan ................................. 9-250178

[51] Int. Cl.⁷ ................................................. G01B 3/10
[52] U.S. Cl. ................................................. 33/758; 33/755
[58] Field of Search ........................... 33/758, 755, 757

[56] References Cited

U.S. PATENT DOCUMENTS

| | | | |
|---|---|---|---|
| 3,036,791 | 5/1962 | Siggelkow | 33/758 |
| 4,574,486 | 3/1986 | Drechsler | 33/755 |
| 4,930,227 | 6/1990 | Ketchpel | 33/758 |
| 5,167,072 | 12/1992 | Richardson | 33/1 SD |
| 5,659,970 | 8/1997 | Reedy | 33/758 |

FOREIGN PATENT DOCUMENTS

| | | |
|---|---|---|
| 1366948 | 6/1964 | France .................................. 33/758 |
| 2115102 | 9/1990 | Japan . |
| 741401 | 7/1995 | Japan . |

*Primary Examiner*—Christopher W. Fulton
*Attorney, Agent, or Firm*—Jordan and Hamburg LLP

[57] ABSTRACT

A tape measure providing with an end hook fastened to a free end of a measuring tape with four rivets through two holes aligned on a longitudinal axis thereof and two holes disposed one on each side of an axial line segment between the shank portion and the catch portion. This fastening system provides toughness and long operation life of the measuring tape. The shank portion has an arcuated shape substantially similar to that of the measuring tape and can cover a substantially whole top surface of the tape end, providing the sufficient protection of the end of the measuring tape against a large shock force produced when the tape is recoiled.

5 Claims, 4 Drawing Sheets

TAPE MEASURE

BACKGROUND OF THE INVENTION

The present invention relates to a tape measure provided with an end hook member attached to the free end of the measuring tape.

A tape measure provided with an end hook slidably riveted to the free end of the measuring tape, which endhook can move with a stroke equal to its thickness along the measuring tape is known. When measuring an outer size of an object, the user hooks the end hook of the tape measure by an inside surface of its catch portion onto the external surface of a thing to be measured and extend measuring tape to the point of measurement. At this time, the end hook moves from the end of the measuring tape until the inside surface of the catch of the end hook is brought into coincidence with a zero point of a scale printed on the measuring tape. When measuring an inner size of an object, the end of the end hook is abutted against the object and, in this case, the end hook moves toward the end of the measuring tape until the front surface of the catch of the end hook is brought into coincidence with the zero mark of the scale printed on the measuring tape.

With the tape measure having the slidable end hook, the zero point of measurement for measuring inner size and outer size of the object is automatically set by movement of the end-hook relative to the end of the measuring tape. In other words, the tape measure eliminates a possible error of the measurement due to the thickness of the catch portion of the end hook.

In the above-mentioned tape measure, the measuring tape is wound on a winding reel provided with a spiral spring therein. The tape measure is usually used by manually extending the measuring tape from the housing against the returning force of the spring when measuring a size of an object and by automatically retracting the measuring tape into the housing by the accumulated returning power of the spring after measurement. The returning movement of the tape is stopped when the end hook strikes the housing. The collision of the end hook with the housing transmits a shock from the hook through the fastening rivets to the measuring tape. After repeated collisions the tape at the rivets may break. Some solutions to solve the above-mentioned problems have been proposed, for example, by Japanese Laidopen Utility Model Publication Nos. 2-115102 and 7-41401 and U.S. Pat. No. 5,659,970.

Recently, there has been a remarkable need for tape measures having wider and longer measuring tapes that must be provided with power return springs having a larger recoiling power. The large measuring tapes, however, involve an increased risk of breakage of the end of the measuring tape because rewinding the extended tape by the increased force of the spring may cause an accelerated movement of an increased mass of the tape and, therefore, the collision of the end hook with the housing may transmit a heavy shock to the tape end that may be broken.

The conventional tape measure has an end hook whose radius of curvature is the same as the measuring tape has. This may introduce an error of inside dimension measurement because the end of the measuring tape may stop at a bend formed between the shank portion and catch portion of the hook, resulting in incorrect zero setting when abutting the catch portion against a reference surface of an object for inside dimension measurement. Furthermore, the end hook may be subjected to cracking in material and/or corrugation thereof at the bend portion in the process of draw forming of the end hook.

The conventional tape measures involve such a problem that a scale figure put on the free end of the measuring tape may be hidden behind the shank portion of the end hook. The shank portion of the end hook is narrow and does not allow making a viewing port therein.

SUMMARY OF THE INVENTION

It is a main object of the present invention to provide an end hook reliably fastened to the free end of the measuring tape of a tape measure and a particular configuration of fastening the end hook to the end of the measuring tape.

BRIEF DESCRIPTION OF DRAWINGS

FIG. 2A is a top view, FIG. 2B is an inside end view, FIG. 2C is an outside end view and FIG. 2D is a sectional side view of the end hook.

FIG. 3A is a top view, FIG. 3B is an outside end view and FIG. 3C is a sectional side view of the end hook.

DETAILED DESCRIPTION

Figure 1:
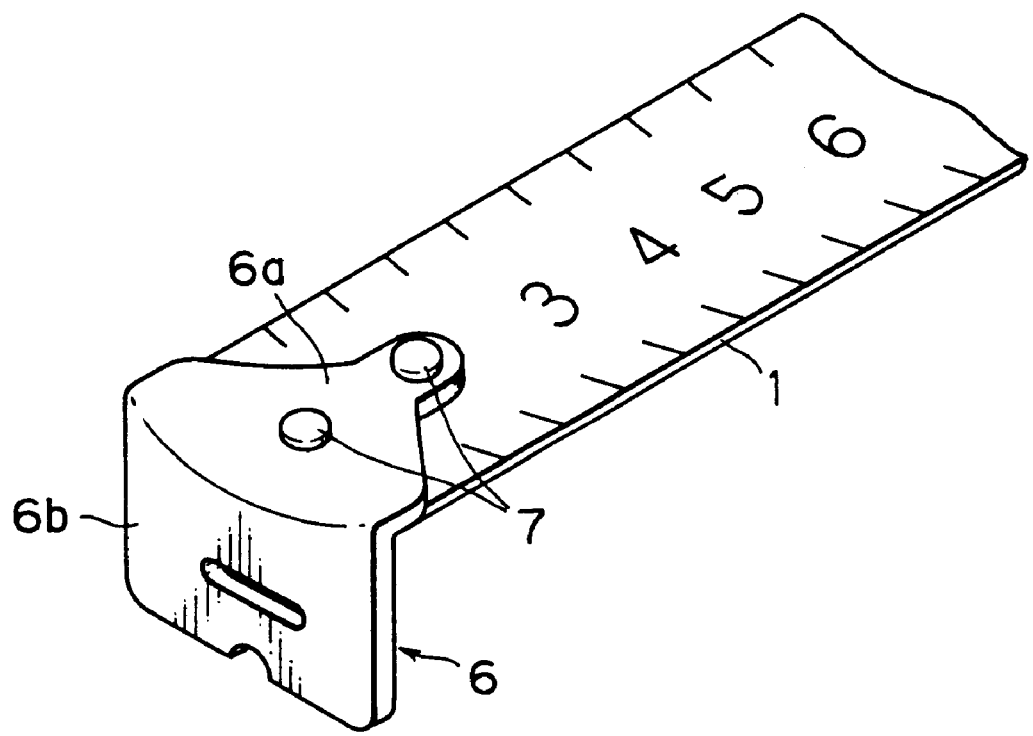
FIG. 1 is a perspective view of an example of a conventional end hook for a tape measure.
Figure 2C:
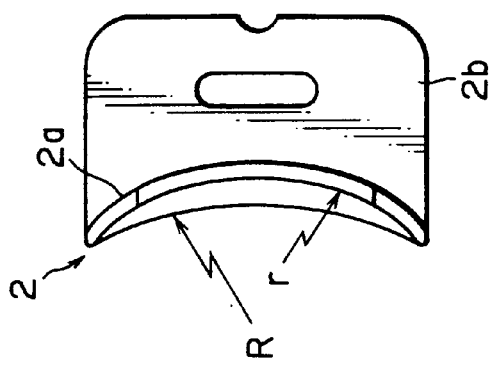
FIG. 2A to FIG. 2D are illustrative of an end hook used for a tape measure according to the present invention.
Figure 2A:
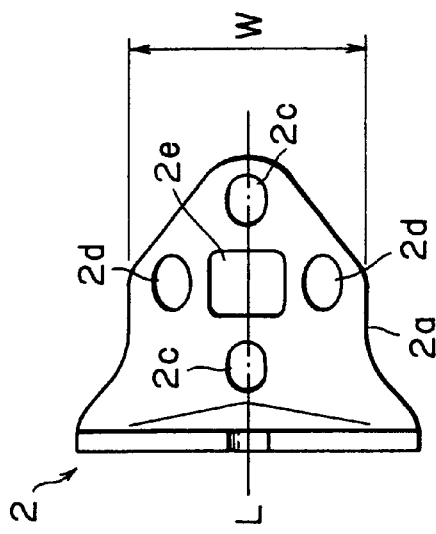
Figure 2B:
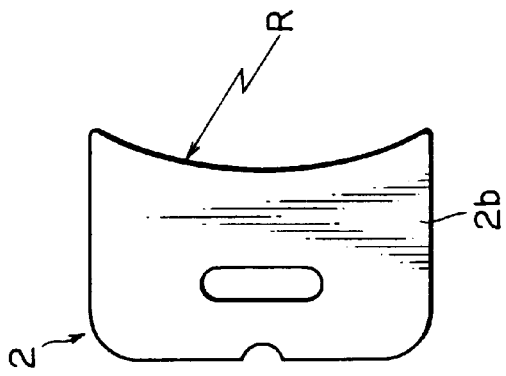
Figure 2D:
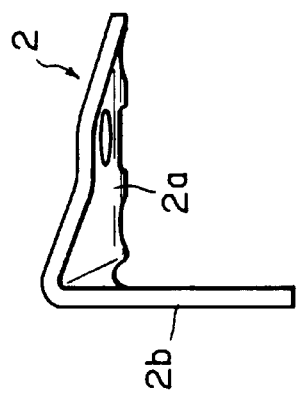

FIG. 1 is perspective view of an example of a conventional end hook. In FIG. 1, numeral 1 denotes a measuring tape and numeral 6 denotes an end hook that is composed of a shank portion 6a, a catch portion 6b and fastening rivets 7. The shank portion 6a has a tapering end and has two holes made therein for fastening with two rivets 7 to the free end of the measuring tape 1.

The measuring tape 1 is wound on a reel provided with a power return spring incorporated therein. The tape measure is usually used by manually extending the measuring tape 1 from the housing against the returning force of the spring when measuring a size of an object and by automatically retracting the measuring tape 1 into the housing by the accumulated returning power of the spring after measurement. The returning movement of the tape 1 is stopped when the catch portion 6b of the end hook 6 strikes the housing. The collision of the end hook 6 with the housing transmits a shock from the hook 6 through the fastening rivets 7 to the measuring tape. After repeated collisions the tape at the rivets breaks.

Recently, there has been a remarkable need for tape measures having a wider and longer measuring tape that must be provided with a power return spring having a larger recoiling power. The large measuring tape, however, has an increased risk of breaking of the end of the measuring tape 1 because rewinding the extended tape by the increased force of the spring may cause an accelerated movement of an increased mass of the tape 1 and, therefore, the collision of the end hook 6 with the housing may transmit a severe shock to the tape end that may be broken.

The conventional tape measures have end hooks whose radius of curvature is the same as the measuring tape has.

This may introduce an error of inside dimension measurement because the end of the measuring tape may stop at a bend formed between the catch portion 6b of the shank portion 6a of the hook 6, resulting in incorrect zero point setting of the measuring tape. Furthermore, the hook may be subjected to cracking and/or corrugation of the bend portion in the process of draw forming of the end hook.

The conventional tape measures involve such a problem that a scale figure put on the free end of the measuring tape may be hidden behind the shank portion 6a of the end hook 6. The shank portion 6a of the end hook 6 is narrow and does not allow making a view port therein.

Referring now to FIG. 2A to FIG. 2D, an end hook used for a tape measure according to the present invention is described in detail.

FIG. 2A to FIG. 2D illustrate an end hook in top view, outside end view, inside end view and sectional side view respectively. As seen in these illustrations, the end hook 2 has a catch portion 2b and a shank portion 2a wherein two pairs 2c and 2d of fastening holes and a viewing port 2e are provided. The shank portion 2a of the end hook 2 has a longitudinal axis shown by a line L in FIG. 2A and is arcuately shaped about the line L with a curvature radius r being substantially equal to a curvature radius of a measuring tape. Two paired fastening holes 2c are aligned on the longitudinal axial line L of the shank portion and two paired fastening holes 2d are symmetrically disposed one on each side of the axial line segment between two paired holes 2c. The fastening holes 2c and 2d are elliptically or slot shaped to allow the shank portion 2a (FIG. 2A) to move left and right from rivets mounted therein. The travel distance is equal to the thickness of the catch portion 2b of the end hook 2. This movement of the end hook 2 compensates for the thickness of its catch portion, thus assuring accurate zero setting of a scale on the measuring on tape when measuring inside or outside dimension of an object. A scale figure can be seen in the viewing hole 2e of the shank portion 2a when the end hook 2 is fastened to the free end of the measuring tape. The viewing hole 2a is not always necessarily provided in the end hooks.

As described before, the conventional tape measure has a bend between the catch portion 2b and the shank portion 2a, which has the same radius R of curvature that the measuring tape has. The use of the tape measure with such end hook for measuring an inside dimension of an object by abutting the front surface of the catch portion 2b against a reference surface of an object may cause the end of the measuring tape to stop at the bend portion of the end hook, resulting in incorrect setting of a reference point of the measuring tape. In addition, draw forming of the end hook with a relatively small curvature of its bend portion may be accompanied by cracks in material and/or corrugation of the bend between the catch portion 2b and shank portion 2a.

On the contrary, the end hook according to the an aspect of the present invention has a bend between the catch portion 2b and shank portion 2a, which radius of curvature R is larger than the radius of curvature r of the shank portion 2a. The shank portion 2a of the end portion has the same radius of curvature r that the measuring tape has, so it can tightly fit to the curved surface of the measuring tape. On the other hand, the bending portion between the catch portion 2a and the shank portion has the radius of curvature R being larger than the radius of curvature r of the shank portion 2a, so the end of the measuring tape can surely be in contact with the inside surface of the catch portion 2b when the latter is pressed against the reference surface of an object to be measured for an inside dimension measurement. This assures an accurate datum of measurement and prevents lateral swing of the catch portion. The enlarged radius of curvature on the bend between the catch portion 2a and shank portion 2b is easier to form by drawing without causing cracks in material and corrugation thereof.

Figure 3A:
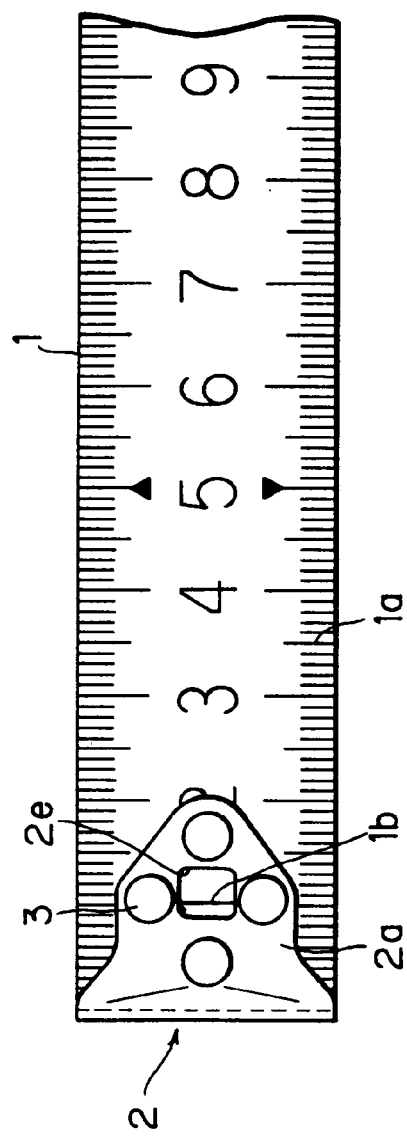
FIG. 3A to FIG. 3C are illustrative of an end hook fastened to the free end of a measuring tape according to the present invention.
Figure 3B:
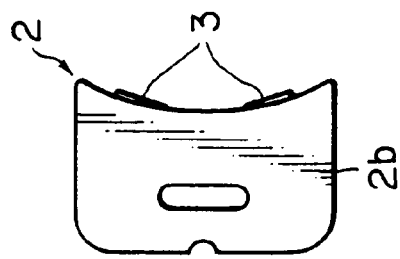
Figure 3C:
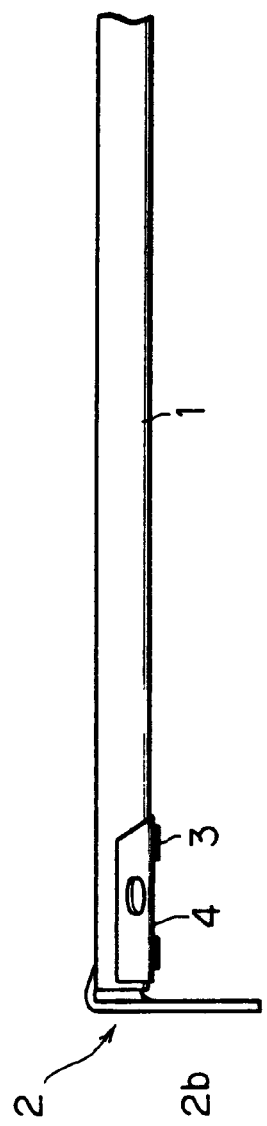
Figure 4:
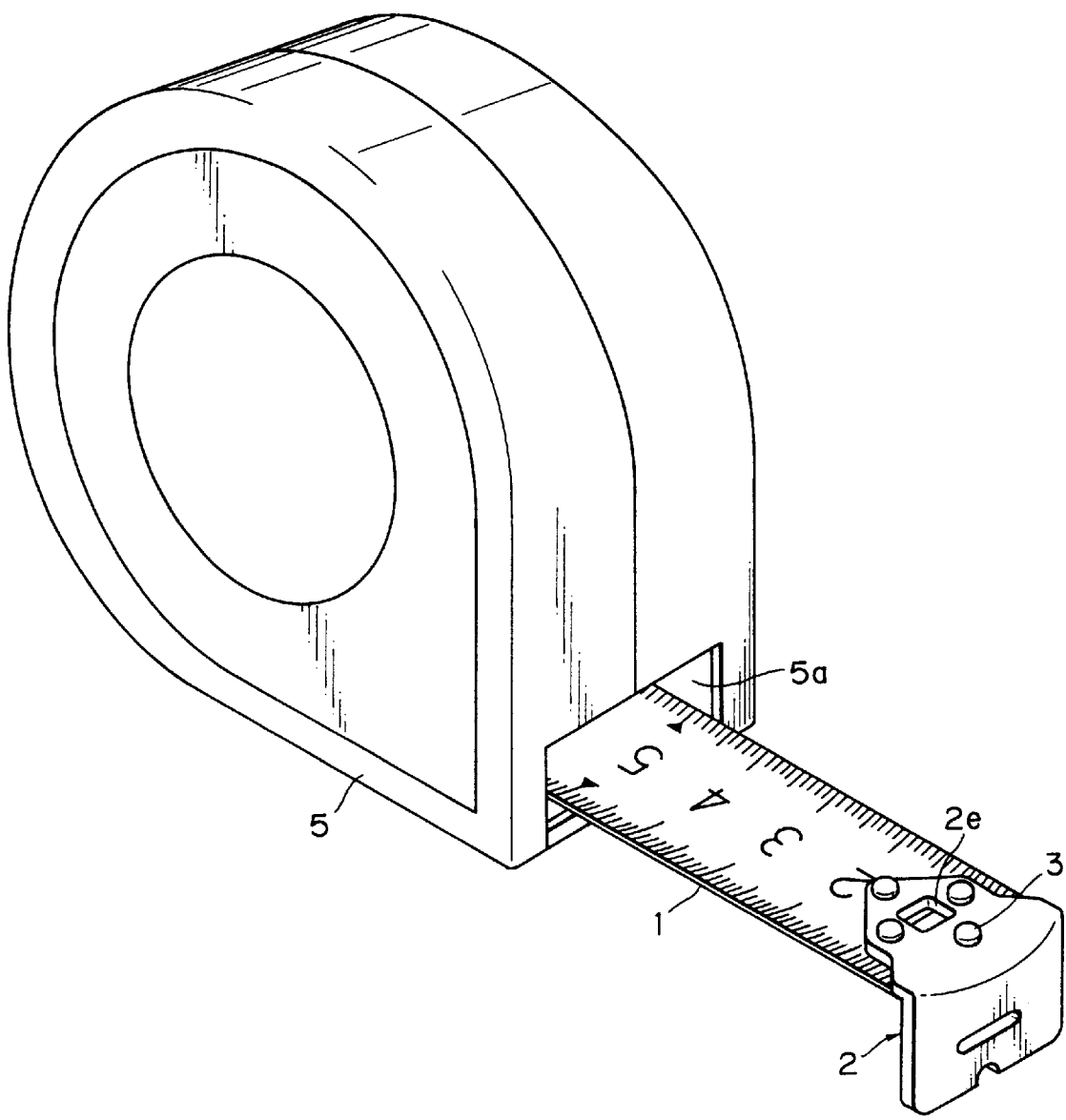
FIG. 4 is a perspective view of an end hook fastened to the free end of a measuring tape according to the present invention.

Referring FIG. 3A to FIG. 3C, the system of fastening an end hook to the free end of a measuring tape will be described as follows:

The end hook 2 and a measuring tape is shown in top view in FIG. 3A, an end view in FIG. 3B and an sectional view in FIG. 3C. The measuring tape 1 has a scale 1a and figures 1b, rivets 3, and a tape reinforcement 4. Other parts similar in function to those shown in FIG. 2 are given like numerals without further explanation. FIG. 4 illustrates in perspective a whole tape measure according to the present invention with a housing 5 having a tape outlet 5a.

The rivets 3 are secured to the measuring tape 1 with the reinforcement 4 put on a rear surface of the measuring tape 1. Heads of the rivets 3 project from the top surface of the measuring tape to allow the shank portion 2a of the end hook 2 to slide relative to a end of the measuring tape 1. The travel distance of the shank portion 2a of the end hook 2 is limited by the elliptically shaped holes in the shank portion 2a and is equal to the thickness of the catch portion 2b of the end hook 2. The number of rivets 3 is equal to the number of mounting holes made in the shank portion 2a of the end hook 2. Namely, the shank portion 2a is fastened to the free end of the measuring tape with four rivets 3 through four mounting holes provided therein at two positions on the longitudinal axis and at two positions on both sides of the line segment between the two axially aligned holes. The four hole pattern provides advantageous distribution of the shock force of the end hook 2 collision with the tape outlet 5a of the housing 5 by the rivets 3 when recoiling the extended measuring tape 1 into the housing 5.

The width W of the center portion of the shank 2a (FIG. 2A) corresponds to 60 to 80 (preferably 70%) per cent of the width of the measuring tape. The shank portion 2a is provided with an elliptically shaped hole 2e in which a figure 1b of the scale can be seen. This is realized owing to the increased width of the shank portion 2a of the end hook 2 as compared with the conventional end hook. The shank portion 2a is arcuately shaped about its longitudinal axis in accordance with the arcuate shape of the measuring tape 1.

In comparison with the conventional end hook fastened with two rivets in series to the free end of the measuring tape, the end hook 2 according to the present invention is fastened with four rivets 3 to the free end of the measuring tape 1 and can more widely protect the tape top surface, thus improving the durability and operation life of the measuring tape.

The provision of two rivet-mounting holes 2d one on each side of longitudinal axis of the widened shank portion 2a of the end hook 2 permits provision of the view port 2e in the center thereof for viewing the scale FIG. 1b printed on the end of the measuring tape 1.

According to the present invention, as described above, a tape measure is provided with an end hook that has a shank portion and a catch portion bent at right angles to the shank portion and that is fastened to the free end of the measuring tape in such a way that the end hook can slide longitudinally on the end of the measuring tape by a distance equal to the thickness of the catch portion, wherein rivets inserted in two fastening holes 2c aligned on the longitudinal axis and two fastening holes 2d disposed one on each side of the axial line segment between the fastening holes 2c can reliably protect the end of the measuring tape, improving the durability of the measuring tape and elongating the service life of the tape measure. Longitudinal swinging of the end hook 2 (i.e., in the longitudinal direction on the free end of the measuring tape 1) can be prevented by the effect of two supporting triangles, each including one rivet in a fastening hole 2c and two rivets in two fastening holes 2d while lateral swinging of the end hook can be prevented by the effect of two supporting triangles each including one rivet in fastening hole 2d and two rivets in two fastening holes 2c.

According to the present invention, a tape measure is provided with an end hook that has a shank portion and catch portion bent at an angle normal to the shank portion and that is fastened with rivets to the free end of the measuring tape in such a way that the end hook slide longitudinally on the end of the measuring tape with a stroke length equal to the thickness of the catch portion, wherein the shank portion has a curved surface which radius is substantially equal to that of the measuring tape to fit with each other and a bend between the shank portion and the catch portion has a larger radius of curvature than that of the shank portion to allow the end of the measuring tape to reliably abut against the inside surface of the catch portion when the end hook is abutted against the object for an inside dimension measurement. This assures an accurate datum of measurement and, at the same time, prevents lateral swinging of the end hook. The end hook with an enlarged radius of curvature R at the bend between the shank portion and the catch portion can be easily formed by drawing without cracking and corrugation of the bend.

According to the present invention, a tape measure is provided with an end hook that has a shank portion and a catch portion bent at a normal angle with the shank portion and is fastened with rivets to the free end of the measuring tape in such a way that the end hook can slide longitudinally on the end of the measuring tape by a distance equal to the thickness of the catch portion, wherein the shank portion has a curved surface having a radius substantially equal to that of the measuring tape, a bend between the shank portion and the catch portion has a larger radius of curvature than that of the shank portion and the shank portion is fastened to the end of the measuring tape with rivets inserted in two fastening holes aligned on the longitudinal axis and two fastening holes disposed one on each side of the axial line segment between the longitudinally aligned fastening holes, thus reliably protecting the end of the measuring tape, improving the toughness and elongating the service life of the measuring tape, thereby providing the combination of advantageous features defined by the above mentioned to the inventions.

According to the present invention, a tape measure is provided with an end hook that has an elliptically shaped hole provided in the center of the shank portion for reading a scale figure printed on the end of the measuring tape. This provides the increased visibility of the scale on the measuring tape.

I claim:

1. A tape measure provided with an end hook comprising a shank portion having a plurality of fastening holes and a catch portion bent at right angles to the shank portion, the end hook being fastened to an free end of a measuring tape with rivets through the fastening holes in such a way that the end hook can slide along a longitudinal axis on the end of the measuring tape by a distance equal to a thickness of the catch portion, wherein the shank portion arcuately shaped about the longitudinal axis to substantially match with the arcuately shaped measuring tape and a bend between the shank portion and the catch portion is arcuately shaped with a larger radius of curvature than that of the shank portion.

2. The tape measure as defined in claim 1, wherein the shank portion of the end hook has a center hole and the measuring tape has a figure printed on the free end of the measuring tape positioned to appear through the center hole.

3. A tape measure comprising:
   a measuring tape having a free end, a longitudinal center axis, and an arcuate profile in cross section having a first radius and extending symmetrically along the longitudinal center axis;
   an end hook including a shank portion, a catch portion, and a bend portion connecting the catch portion to the shank portion at a right angle with respect to the shank;
   the shank portion and the free end being superposed on each other and having a first set of two fastening holes extending through the shank portion and the free end, the first set of two fastening holes being provided along the longitudinal center axis and a second set of two fastening holes extending through the shank portion and the free end, the second set of two fastening holes having one fastening hole of said two fastening holes on each side of an axial line segment extending between the two fastening holes of the first set of two fastening holes and on a lateral line orthogonal to the axial line segment;
   the shank portion of the end hook being slidably fastened to the free end of the measuring tape with first rivets extending through the first set of two fastening holes and second rivets extending through the second set of two fastening holes;
   the first and second sets of two fastening holes being configured such that the end hook can slide along the longitudinal center axis on the free end of the measuring tape by a distance equal to a thickness of the catch portion; and
   the shank portion having an arcuate cross section having a radius and being symmetrically disposed about the longitudinal center axis to substantially match the arcuate profile of the measuring tape; and
   the bend portion connecting the shank portion and the catch portion having an arcuate cross section symmetrically disposed about the longitudinal center axis with a larger radius of curvature than the radius of the arcuate cross section of the shank portion.

4. The tape measure as defined in claim 3, wherein the shank portion of the end hook has a center hole and the measuring tape has a figure printed on the free end of the measuring tape positioned to appear through the center hole.

5. A tape measure comprising:
   a measuring tape having a free end, a longitudinal center axis, and an arcuate profile in cross section having a first radius and extending symmetrically along the longitudinal center axis;
   an end hook including a shank portion, a catch portion, and a bend portion connecting the catch portion to the shank portion at a right angle with respect to the shank portion;
   the shank portion and the free end being superposed on each other and having at least one fastening hole extending through the shank portion and the free end;

the shank portion of the end hook being slidably fastened to the free end of the measuring tape with a fastener extending through the at least one fastening hole;

the at least one fastening hole being configured such that the end hook can slide along the longitudinal center axis on the free end of the measuring tape by a distance equal to a thickness of the catch portion;

the shank portion having an arcuate cross section having a radius and being symmetrically disposed about the longitudinal center axis to substantially match the arcuate profile of the measuring tape; and the bend portion connecting the shank portion and the catch portion having an arcuate cross section symmetrically disposed about the longitudinal center axis with a larger radius of curvature than the radius of the arcuate cross section of the shank portion.

* * * * *